US008019715B2

(12) United States Patent
Lai et al.

(10) Patent No.: US 8,019,715 B2
(45) Date of Patent: Sep. 13, 2011

(54) DATA PARTITIONING AND CRITICAL SECTION REDUCTION FOR BAYESIAN NETWORK STRUCTURE LEARNING

(75) Inventors: Chunrong Lai, Beijing (CN); Wei Hu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 11/665,947

(22) PCT Filed: Dec. 31, 2004

(86) PCT No.: PCT/CN2004/001590
§ 371 (c)(1),
(2), (4) Date: Apr. 20, 2007

(87) PCT Pub. No.: WO2006/069495
PCT Pub. Date: Jul. 6, 2006

(65) Prior Publication Data
US 2008/0281771 A1    Nov. 13, 2008

(51) Int. Cl.
G06F 17/00 (2006.01)
G06N 7/00 (2006.01)
G06N 7/08 (2006.01)
(52) U.S. Cl. .......................................................... 706/55
(58) Field of Classification Search ............... 706/55
See application file for complete search history.

(56) References Cited

U.S. PATENT DOCUMENTS

| | | | | |
|---|---|---|---|---|
| 6,009,452 A * | 12/1999 | Horvitz | ........................ | 718/102 |
| 6,578,065 B1 | 6/2003 | Aglietti et al. | | |
| 2003/0212679 A1* | 11/2003 | Venkayala et al. | ................ | 707/6 |
| 2003/0212691 A1* | 11/2003 | Kuntala et al. | ................ | 707/100 |
| 2003/0212713 A1* | 11/2003 | Campos et al. | ............... | 707/200 |
| 2003/0212851 A1* | 11/2003 | Drescher et al. | ............. | 711/100 |

FOREIGN PATENT DOCUMENTS

CN    1540507    10/2004

OTHER PUBLICATIONS

'Mapping and Parallel Implementation of Bayesian Belief Networks': Saxena, 1996, IEEE, 0-81867683-3, pp. 608-611.*
'Parallelization of Bayesian Network based SNPs Pattern Analysis and Performance Characterization on SMP/HT': Song, Jul. 2004, IEEE, 1521-9097/04.*
'Artificial Intelligence A Modern Approach': Russell, 2003, Pearson Education Inc.*
'Hyperthreading Technology in the Netburst Microarchitecture': Koufaty, 2003, IEEE, 0272-1732; pp. 56-65.*
First Office Action mailed Jul. 11, 2008 for Chinese Application No. 2004 80044805.0.

(Continued)

*Primary Examiner* — Omar F Fernandez Rivas
*Assistant Examiner* — Peter Coughlan
(74) *Attorney, Agent, or Firm* — Blakely, Sokoloff, Taylor & Zafman LLP

(57) ABSTRACT

In a parallel system, multiple threads operate in parallel to perform network structure learning. A global score cache is partitioned into multiple split score caches, which may in one embodiment include associating a score cache with a node of the structure to be learned. With a split score cache, the learning may be performed in split neighbor scoring loops, with the first loop operating on separate score cache partitions, and warming the score cache partitions for the second loop.

18 Claims, 3 Drawing Sheets

OTHER PUBLICATIONS

Notice of Reasons for Refusal mailed Dec. 7, 2010 for Japanese Patent Application No. 2007-548666—Translation available.
International Search Report and Written Opinion mailed May 19, 2005 for International Application No. PCT/CN2004/001590.

Murao, Naoya et al., "Empirical Investigations on the Parallelized Bayesian Optimization Algorithm", IPSJ Research Report, Information Processing Society of Japan, Mar. 3, 2004, vol. 2004, Issue 20, pp. 169-174 (Domestic Conference Paper 2005-00384-028).

* cited by examiner

DATA PARTITIONING AND CRITICAL SECTION REDUCTION FOR BAYESIAN NETWORK STRUCTURE LEARNING

CROSS REFERENCE TO RELATED APPLICATION

The present application is a U.S. National Phase Application under 35 U.S.C. §371 of International Application No. PCT/CN2004/001590 filed Dec. 31, 2004 entitled DATA PARTITIONING AND CRITICAL SECTION REDUCTION FOR BAYESIAN NETWORK STRUCTURE LEARNING.

FIELD

Embodiments of the invention relate to network structure learning, and particularly to data partitioning for Bayesian network structure learning.

BACKGROUND

Large amounts of information, especially related information, may be organized into network structures. A Bayesian network is a common example of such a network structure. The use of Bayesian networks is increasing in bioinformatics, pattern recognition, statistical computing, etc. The learning of a Bayesian network structure is very computationally intensive, and the solution for finding a true "optimal" structure may be NP-complete. Even as the learning of Bayesian network structures is very computationally intensive, networks with much larger data sets are being explored, which may increase the computational intensity, and potentially include an exponential increase in computational intensity. Heuristic approaches often focus on improving the performance efficiency of structure learning, for example, decreasing execution time. Performance efficiency is increasingly important in providing acceptable practical solutions to modern networks.

Parallel learning approaches have been considered to include the resources of multiple computation machines and/or processing cores in performing a structure learning algorithm. The parallel nature of these approaches attempts to distribute work among multiple resources to reduce the time any one system spends to find a solution. Traditional parallel learning distributes computation tasks in a basic, naive manner, which typically considers only numbers of tasks assigned to each parallel computing resource in distributing the computation tasks among the parallel computing resources.

For example, in a neighbor score computation, a primary or master thread may distribute neighbor computations among other available threads. In computing a neighbor a thread may check a score cache to determine if a family score is known for the structure. The score cache is traditionally a data structure of known and stored network family scores, shared among the threads, and accessed as a hash table. If the score is known (resulting in a cache hit), the computing resource may simply load the score and use it to compute the neighbor score (the score of the directed acyclic graph (DAG), or structure, of interest). If the score is not known (resulting in a cache miss), the computing resource may be required to compute the family score prior to computing the neighbor score. Note that as a data structure available to multiple threads, score cache access may be required to be in a critical section to reduce overrunning the data. Thus, there may be a period where the computing resource may inefficiently use its resources and/or sit idle waiting for another computing resource to release the score cache. Thus, current or traditional multiprocessing/hyper-threading approaches to structure learning may fail to provide a desired performance for structure learning for networks of increasing size and complexity.

BRIEF DESCRIPTION OF THE DRAWINGS

The detailed description below includes various illustrations in figures and accompanying drawings by way of example, and not by way of limitation. These figures may be briefly described as follows.

DETAILED DESCRIPTION

Figure 1:
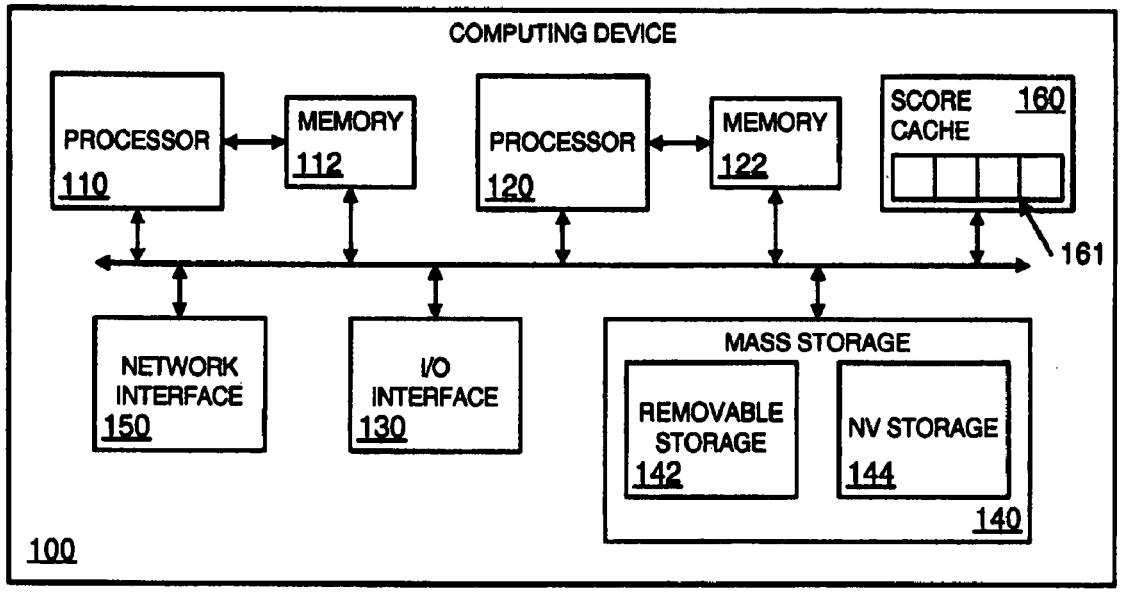
FIG. 1 is an embodiment of a block diagram of a computing device having a partitioned score cache.

Structure learning in a very general sense has application with Bayesian networks as a method for discovering the probabilistic relationship between variables in a network of nodes, each node representing a condition/state and/or information relating to a cause and/or effect of a condition/state. Structure learning may represent the network by constructing a network structure representation based on the probabilistic relationships between individual nodes. Hill-climbing is an algorithm often used for learning static and/or dynamic Bayesian networks, and may include the use of a score cache, which is a multi-dimensional sparse matrix, typically implemented as a hash table. Each element of the matrix stores the score of a node family or family of nodes (or simply "family" herein). A family includes a current, or target, node of interest (the child node) and the parent nodes (or simply "parents" herein) of the current node. Parent and target nodes may be related with a probabilistic relationship. The score cache may be used to store a score of a family after the score has been computed.

For structure learning, a learning algorithm generally first loads training data (known relationships) and based on the training data and particular scoring metrics, computes scores to determine a structure. The algorithm computes the score for a start point, or an initial current structure, which may be an initial user-defined Bayesian Network structure from which the structure learning will begin. The neighbors (structures separated from the current structure by an edge difference) of the start point could be generated and each neighbor's score computed. A traditional approach to score computing for each neighbor involves looking up a score cache to determine whether a score for a family corresponding to the neighbor is known, or already computed. It can be assumed that a family score will not change; therefore, if the score has been computed for one calculation, it may be stored and reused in another calculation. If the family score is available, the score may be loaded directly and the neighbor score computed. If the score is unavailable, the score of the entire structure (including the family) is generally computed and the score cache updated. The process typically repeats for all neighbors, and the algorithm chooses the neighbor with the maximum score as the new current structure from which a next iteration of learning may begin. Optimally the process is repeated until no neighbor exists that can score higher than the current structure. Practical applications often use heuristic approaches, as determined for an implementation, because an optimal solution may be impractical or impossible to achieve.

A common problem with structure learning is the computational intensity and related long execution times. Parallelization may speed up the structure learning process by distributing neighbor scoring tasks/calculations among multiple threads (e.g., parallel cores, arithmetic logic units (ALUs), processing cores, processors, central processing units (CPUs), etc.). In a naive parallelization approach, each thread may receive one or more neighbors to compute, the neighbors being equally distributed among the threads. The contents of the score cache and/or the processes involved in accessing the score cache may affect the performance of a thread, create racing conditions, delays, etc. Traditionally the score cache is a single data structure accessible to each thread, which may result in conditions similar to those just mentioned. Current parallelization approaches involve creating critical sections to restrict cache access to one thread at a time. An alternative may be to store multiple versions of the cache, one for each thread, but this may result in unacceptable levels of overhead penalty.

System efficiency can be improved by providing improved locality optimization and load-balancing among the computation tasks. Additionally, the scoring algorithm may be restructured for execution to enable more efficient use and/or access of the score cache. In one embodiment the score cache is partitioned into multiple sub-parts. For example, the score cache may be an array of individually addressable memory structures, each element of the array being a score cache for a node. In a complex directed acyclic graph (DAG), e.g., one including thousands of nodes, the penalty incurred by the irregular access pattern of a hash-index function may be reduced by providing a score cache array. The penalty of the hash-indexing may be replaced by a penalty associated with the higher overhead of managing the score cache. In large, complex DAGs, the penalty for irregular/arbitrary access may be much higher than the penalty for overhead.

For example, in a gene network application, the DAG may consist of thousands of nodes, meaning the score cache needs to store millions of elements. The hash-index function may introduce a considerably higher penalty than managing a score cache array having an array element for each of the thousands of nodes. For example, arbitrary cache access for a gene-network having 2400 variables (thus corresponding to a DAG having 2400 nodes) may incur a higher penalty than accessing a score cache generated with an addressable array of 2400 elements. In one embodiment each element represents a small score cache that stores only the scores of the corresponding node in the gene network.

Furthermore, a split score cache approach provides an opportunity to reorganize the neighbors of the current DAG in the scoring. When evaluating the neighbors that add or delete an edge to the same node, the scoring algorithm (and thus the thread executing the algorithm) may obtain all information necessary to complete the neighbor calculation by accessing only a single score cache array element corresponding to the particular node (referred to herein as a split score cache). Thus, a managing entity that distributes neighbors to score can group neighbors related to a node to improve the locality of accessing the score caches. For neighbors that reverse edges, two operations are implied: deleting the original edge, and adding an edge of the opposite direction. In this case each reverse will access one split score cache for the child node and one for the parent node. Reverse neighbors can be grouped with neighbors that perform an add/delete edge to the same child node, which may control access patterns of the scoring/ computing functions, and therefore improve accessing locality. The result of improved locality is better running speed. Note that the split score cache with optimized access produces both temporal and geographic locality performance enhancements.

Partitioning data with split score caches may also reduce the possibility of data racing, or a race condition. If different end nodes are distributed to different threads, the possibility of interdependency of data among threads is reduced. Critical sections may still be used to compute reversal edges, which may access two score caches corresponding to the start and end nodes, but otherwise, the use of critical sections may be significantly reduced.

Thus, partitioning the score cache may improve data access locality, fine-grained management ability for the scoring algorithm, as well as providing for elimination of many critical sections in a multi-threaded implementation of a scoring algorithm. In one embodiment a main scoring loop is split into two loops. In the first loop, a thread may be allowed access only to certain parts of the score cache, which may be different parts/subsections available to another thread. Also, a thread in the first loop may attempt to "warm" a score cache for other threads. Warming the score cache may include loading the score cache with the family scores for one or more families associated with the node. If the score caches are pre-loaded for use in the second loop by the processes of the first loop, the second loop may not need critical sections due to the fact that each cache will only be read and not written to. Loading the score caches on the first loop may result in no cache misses on the second loop, and reduce or eliminate the possibility of data racing, even without critical sections. As a result, the multi-thread scalability is significantly increased with this approach. For example, experiments show that implementing these techniques may provide a 1.95× speed-up on a dual processor (DP) simultaneous multiprocessor (SMP) machine/system. It can also potentially get nearly linear speedup on SMP, CMP (on-chip multiprocessor), and/ or non-uniform memory access NUMA parallel processing machines with more processors or CPUs (central processing units) due to the described data partitioning. Note that a performance degradation of approximately 3-11% may be observed in scoring networks with small numbers of nodes because of additional overhead in memory and execution time to manage the split score caches.

Various references herein to an "embodiment" are to be understood as describing a particular feature, structure, or characteristic included in at least one embodiment of the invention. Thus, the appearance of phrases such as "in one embodiment," or "in alternate an embodiment" may describe various embodiments of the invention, and may not necessarily all refer to the same embodiment.

FIG. 1 is an embodiment of a block diagram of a computing device having a partitioned score cache. Computing device 100 represents a computer, server, workstation, or other computing device/apparatus/machine. Computing device 100 may be multi-threading to allow simultaneous/parallel handling of different processes. Processor 110 represents one or more processing units and/or computing cores. Processor 110 may include a central processing unit, a microcontroller, a digital signal processor (DSP), an ALU, etc. Processor 120 likewise represents one or more processing units and/or computing cores, and may include a central processing unit, a microcontroller, a DSP, an ALU, etc. Processors 110 and 120 may operate in parallel. In one embodiment processors 110 and 120 represent parallel processing cores of computing device 100. In one embodiment computing device 100 does not include processor 120. Computing device 100 may represent a simultaneous multi-processor (SMP) system, an on-chip multi-processor (CMP) system, and/or other parallel processing non-uniform memory access (NUMA) system.

Memory 112 may provide storage for temporary variables and/or instructions for execution by processor 110. Memory 112 may represent on-chip memory, for example, a cache layer on processor 110, volatile storage on a system bus of computing device 100, a system random access memory (RAM), etc. Memory 112 may be accessible directly by processor 110, accessible over a system bus, and/or a combination of these. Memory 122 may be similarly described with respect to processor 120. In one embodiment, a memory/cache is commonly accessible to both processors 110 and 120.

In one embodiment computing device 100 includes I/O (input/output) interface 130, which represents one or more mechanisms/devices through which computing device 100 may receive input from an external source and/or provide output to an external source. An external source may include another computing system, a user, etc., and may include display devices, cursor controls, alphanumeric input devices, audio input and/or output devices, visual display (e.g., light emitting diodes (LEDs)), etc. I/O interface 130 may also include drivers for I/O devices. Information/data/instructions received through I/O interface 130 may be stored in memory 112 and/or memory 122 and/or mass storage 140. Mass storage 140 represents one or more of various storage mechanisms, including removable storage 142 (e.g., disk drives, memory sticks/cards/slots, universal serial bus (USB)-connected devices, etc.) and non-volatile storage 144 (e.g., disk drives, memory sticks/cards, slots, hard disk drives, etc.). Mass storage 140 may store programs/application and/or instructions for loading into memories 112 and/or 122 for execution on processors 110 and/or 120, and/or data relating to or associated with a program or instruction.

The data, instructions, and/or program information may be provided via an article of manufacture by a machine/electronic device/hardware and performed by/on computing device 100. An article of manufacture may include a machine accessible/readable medium having content to provide instructions, data, etc. The content may result in computing device 100 performing various operations, executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above.

In one embodiment computing device 100 may include network interface 150, which may include a wired or wireless interface and/or both wired and wireless interfaces. Network interface 150 may represent a network card/circuit through which computing device 100 may interface with a parallel computing device over a network.

In one embodiment computing device 100 includes score cache 160, which may represent one or more components to provide storage of values for structure learning of a data network. Score cache 160 may include multiple partitions/subsections/elements 161, which may be individually addressable memory locations/sections. Each location may be addressed/accessed by structuring score cache 160 as an array of elements, with each element of the array an element 161. Score cache 160 may represent hardware and/or software components to manage storage hardware. In one embodiment score cache 160 represents a data structure accessible to processor 110 and processor 120. Storage of data in score cache 160 and access to the data may be controlled in a structure learning process to reduce data racing, to improve locality, and eliminate one or more critical sections. Score cache 160 is shown generically in computing device 100, and may be understood as data stored on mass storage 140, as executing in one or both of processors 110 or 120, and/or as residing in one or both of memory 112 or 122.

Figure 2:
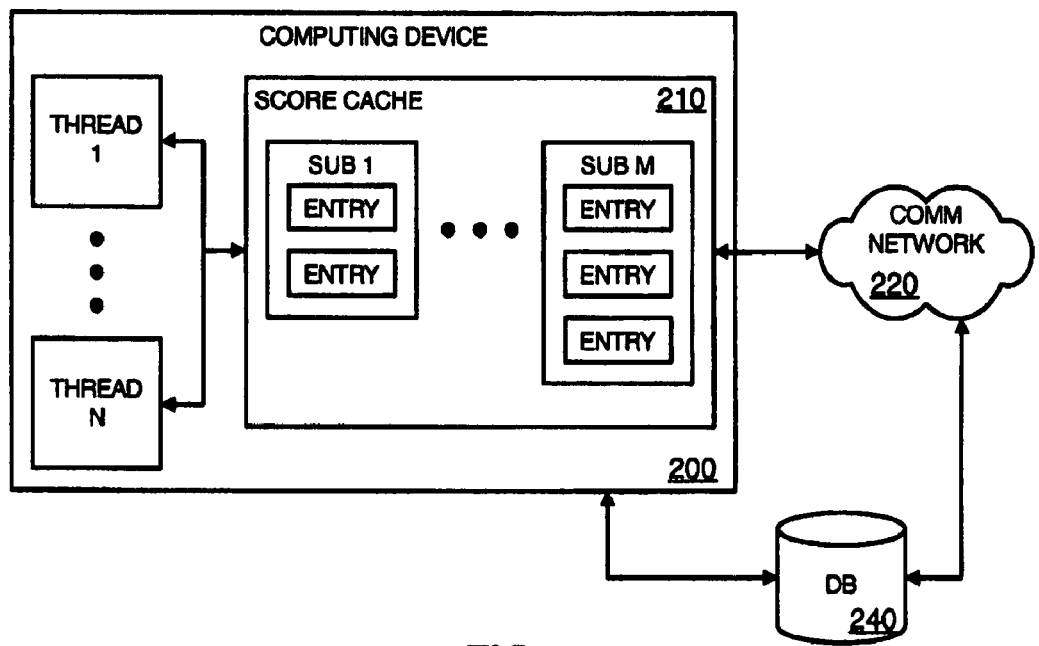
FIG. 2 is an embodiment of a block diagram of a multi-threading computing device having a partitioned score cache.

FIG. 2 is an embodiment of a block diagram of a multithreading computing device having a partitioned score cache. Computing device 200 represents a device, system, apparatus, and/or computer that executes/controls execution of a program. Computing device 200 may execute part or all of a network structure learning function or program. Computing device 200 includes multiple threads, 1 to N, where N represents an integer. For example, threads 1 to N may represent multiple parallel computing resources on an SMP, CMP, or NUMA machine. In one embodiment computing device 200 also include score cache 210, partitioned into multiple subparts, sub 1 to sub M, where M represents an integer that may or may not be the same value as N. For example, computing device 200 may include 2 threads and partition score cache 210 into 1000 elements. In another example, computing device may include 16 threads and partition score cache into 20 elements. The description of the techniques herein is not limited to these or any other particular implementations. The approach is scalable to multiple parallel computing resource (threads) and from small network structures to large and complex structures to learn.

Each partition, sub 1 to sub M, may include multiple entries, which may or may not be the same number of entries for each partition. The representation in FIG. 2 is intended as an illustration only, and is not intended to indicate a number of entries that may be associated with any particular partition. In one embodiment each partition is associated with a different node in a network structure to learn. The entries may represent values for different families associated with each node, or may represent different node states (e.g., relationships with other nodes). Once a value is computed and stored in, for example, sub 1, the values can be assumed to be constant. Thus, the value can be scored once, stored in an entry in sub 1, and individually addressed for later access to use in calculating a future neighbor score.

Each of sub 1 to sub M may be accessed by any of thread 1 to thread N. In one embodiment access from the various threads is controlled to the various partitions. The access may be controlled by organization of the computational tasks to be executed by the threads. For example, thread N may be given consecutive tasks with which to compute each of the entries of sub M. If in a later computation task, thread 1 were to access sub M, all values would be calculated, and there would be no cache miss in the access by thread 1. In this way, both thread 1 and thread N could access sub M without the need for a critical section, because the value of the entries will not be changed.

In one embodiment communication network 220 represents a wide area network (WAN), e.g., the Internet, and may also represent a local area network (LAN), or other local interconnection between computers. Communication network 220 may represent a combination of a LAN and a WAN, and may include wired and/or wireless connections/links. Communication network 220, representing an interconnecting of computing devices, should not be confused herein with a data network or network structure (e.g., a Bayesian network), which may refer to a logical representation of information and internal relationships of the information.

In one embodiment database (DB) 240 is coupled with computing device 200, which may be a direct link, or a communicative interface over, for example, communication network 220. In this example communication network 220 may represent one or more intermediate connections between computing device 200 and database 240. Database 240 may represent any number of database hardware devices, servers, etc., that may store information/data. In one embodiment database 240 includes information related to a network structure to be learned. For example, database 240 may include the evidences (e.g., known data, training data) from which one or more families or other network structures are derived. Thus, database 240 may include the data with which to learn a structure, the data from which the neighbors are determined, the families associated with neighbors are determined, etc. Database 240 may also be considered to store the network structures themselves. Handles may be generated for the network structures either by database 240 and/or one of the threads of computing device 200. The information of database 240 may be used compute family scores that will be loaded into score cache 210.

Figure 3:
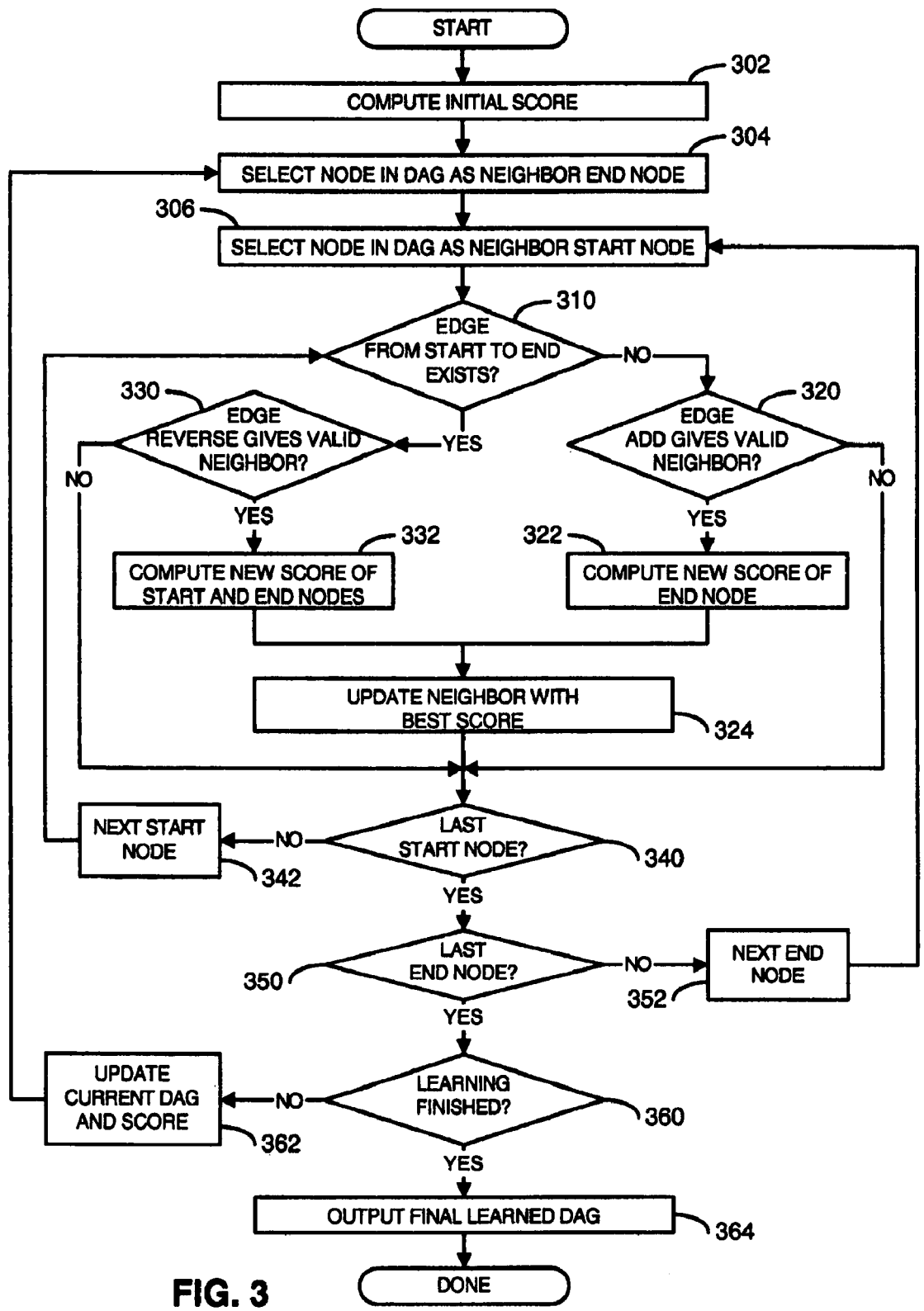
FIG. 3 is an embodiment of a flow diagram of splitting a structure learning loop into inner and outer loops.

FIG. 3 is an embodiment of a flow diagram of splitting a structure learning loop into inner and outer loops. To begin structure learning, a structure may be selected as a starting point, and neighbors may be determined. The determination of neighbors and the selecting of one or more start structures may be performed by a main thread. The main thread may distribute neighbor calculation tasks to multiple parallel computing threads, including the main thread itself. Whether at a main thread or a parallel thread, an initial score is computed, 302. This computation and any other computations, operations, execution derived from the elements of FIG. 3 may be performed in multiple thread simultaneously, or substantially simultaneously, and may be said to operate in parallel. The starting point may be selected based on given criteria/parameters in a structure learning program, selected randomly, or selected based on other reasons. The thread may select a node in the DAG as an end node, 304, and select a node as a start node, 306. The end node is the child node, to which the arcs will be directed. The start node is the parent node; the relationship between the two nodes as parent and child is represented by the arc, or edge. The start and end nodes may also be selected at random, as the first in a list of nodes, or based on some other criterion. In one embodiment the selection is not significant.

The thread determines if the edge from the start to end node exists, 310. For example, the thread may access a score cache to determine if the value for the edge has been computed. In the case of a split score cache, the access to the score cache may be to a score cache or segment or partition of a score cache associated with the node. If the edge does not exist, the thread may determine if adding the edge results in a valid neighbor, 320. If a valid neighbor will result, the new score of the end node is computed with the new edge added, 322. The thread may determine the neighbor score based on the new edge, and determine if the neighbor scores better than the current best neighbor, and updates the best scoring neighbor if the computed neighbor scores better, 324.

If the edge does exist, the thread may determine if a reverse edge would generate a valid neighbor, 330. If a valid neighbor would result, the new score of the start and end nodes may be computed, 332. The thread may determine the neighbor score based on the new edge, and determine if the neighbor scores better than the current best neighbor, and updates the best scoring neighbor if the computed neighbor scores better, 324. With the best scoring neighbor updated, if the edge from the start node to the end node does not generate a valid neighbor, or if the reverse edge does not generate a valid neighbor, the thread determines if the start node scored is the last start node for the selected end node, 340. This determination makes use of a split or partitioned score cache to provide better locality for faster execution of the scoring algorithm. For example, a split score cache may have a single addressable memory location for the end node, and each entry at the memory location represents a score associated with the end node in relation to a start node. Note that the role of the end and start nodes could be changed with similar results.

If the start node is not the last start node, next start node is selected, 342, and the process is repeated until all start nodes have been processed. If all start nodes have been processed, the thread determines if all end nodes have been processed, 350. This structure provides a first loop and a second loop, where the first loop processes the values in the score caches for the nodes. In this way the first loop loads the caches for use by the second loop, and so warms the score caches. If the last end node has not been processed, the next end node is selected, 352, and the processing begins for that end node. If the last end node has been processed, the thread determines if the learning is finished, 360. If the learning is node finished, the current DAG is updated and scored, 362, and the process is repeated until no neighbor can score higher than the current structure. If the highest scoring neighbor has been found, the final learned DAG is output, 364.

Figure 4:
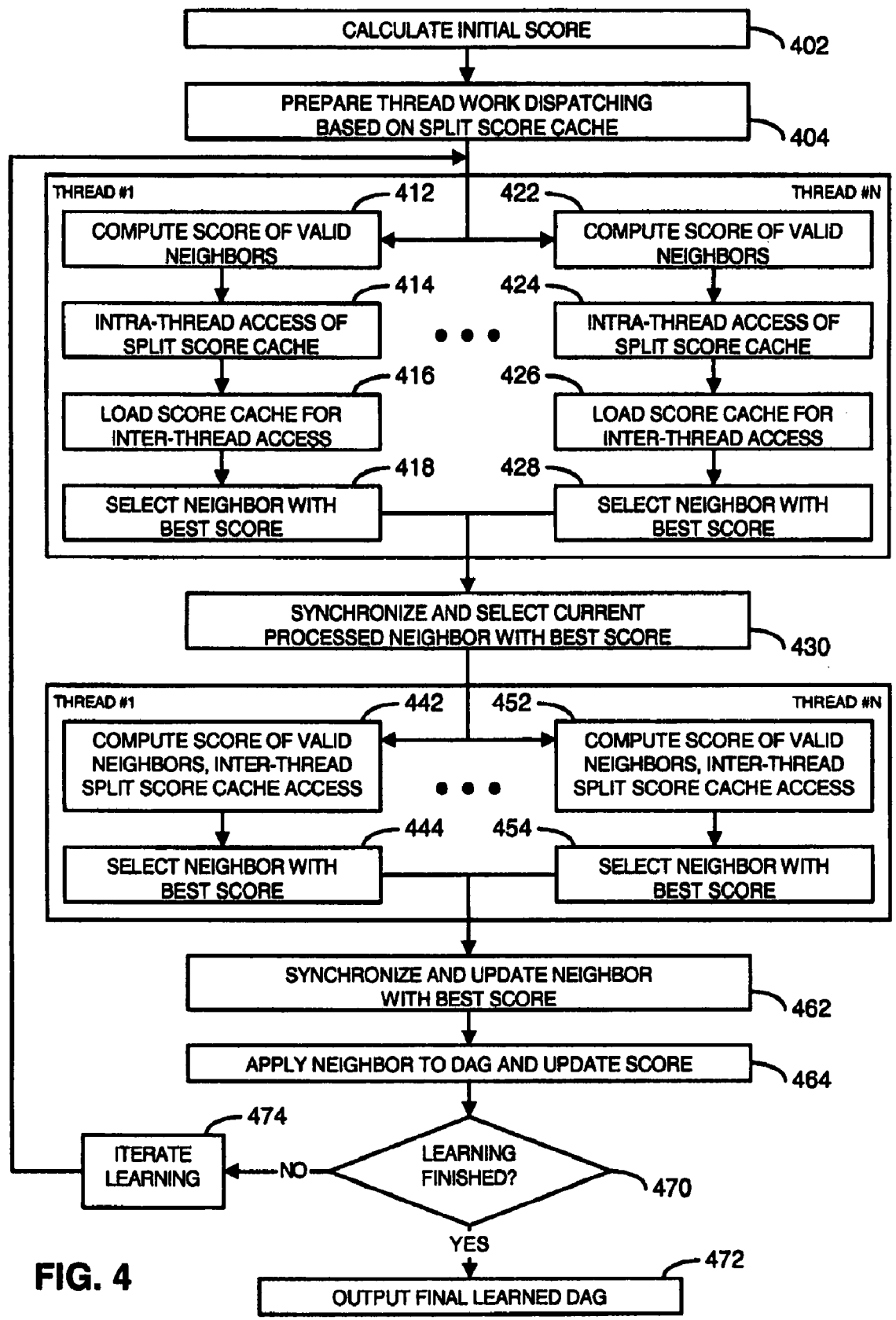
FIG. 4 is an embodiment of a flow diagram of structure learning with a split score cache.

FIG. 4 is an embodiment of a flow diagram of structure learning with a split score cache. A main or master thread calculates an initial score, 402, for a structure to be learned. The initial score provides a starting point for the learning. The master thread prepares thread work dispatching to parallel threads based on a split score cache architecture, 404. In one embodiment the main score cache data structure is partitioned into multiple small, or split, score caches, which may be one split score cache for each node of the network to be learned, The score computations will be distributed (dispatched) among parallel threads for processing. The split nature of the score cache allows certain optimizations in the work distribution that provides for the amount of work done sequentially (as opposed to in parallel) to be reduced in the system.

The master thread distributes the computation tasks to each available thread, thread 1 to thread N. The computation tasks may include part or all of the operations for computing the score of a neighbor. Each thread computes the score of the valid neighbors, 412, 422. Because the score cache is split, the threads may be assigned score computations that do not conflict on the first loop of neighbor computations. Traditionally, parallelization consisted of generating all neighbors and equally distributing them for calculation to the threads. Then the threads process the assigned neighbors individually. However, because a thread may first look up the score cache to see if a score has been computed for a neighbor calculation, the fact that only a global score cache was traditionally used meant that score cache access needed to be monitored by critical sections to avoid data racing (race condition) and ensure thread safety. This is because if a query missed, the thread would calculate the score and update the score cache. In this case, different threads may have attempted to write to the same entry of the global score cache.

However, critical sections reduce the benefit of parallelization because part of a multi-threaded program runs sequentially, which significantly reduces the scalability. For example, in execution of the gene-network, up to 60% of execution time may be performed sequentially due to critical sections. According to Amdah's Law, if 60% of execution time is sequential, a dual processor system is limited to a speedup no larger than $1((1-0.60)/2+0.60)=1.25\times$, and a quad processor system is limited to a speedup no larger than $1/((1-0.60)/4+0.60)=1.43\times$. This corresponds to only 0.625 or 0.358 of potential linear speedup, respectively. It will be understood that increasing the number of processors exacerbates the discrepancy between linear speedup and actual speedup.

With split score caches, the main neighbor scoring loop of each learning iteration can be split into two smaller loops. The first loop processes the neighbors of add/delete edges and warms up the split score caches for cases of corresponding reverse edge. In one embodiment this may be accomplished without critical sections because all the data/operations are completely partitioned, preventing the threads from conflict on score cache data. Because the scores computed are written to the split score caches, the system of threads can be synchronized and every subsequent query to the score caches may result in a score cache hit, eliminating the need to write the score caches again. Thus, the second (latter) loop can process the reverse edge neighbors by reading the split score caches without critical sections also, because all the computations needed have been performed in the first loop.

Thus, the intra-thread access of the split score caches, 414, 424, is performed by the threads on score cache partitions (e.g., elements of a score cache array) that are processed by only the particular thread. The thread can score the values for the node associated with the score cache partition, and load the score cache for later inter-thread access, 416, 426, This might be the second loop, as discussed above. The thread selects the neighbor with the best score, 418, 428, which is typically the highest score in a hill climbing implementation, although an implementation could be designed wherein a lowest score, or a score nearest to a particular value would be the best score.

The processing performed by the various parallel threads is synchronized, typically by the master thread, which selects the current processed neighbor with the best score, 430. The second loop may then be processed to determine if a better-scoring neighbor exists. The operations are again dispatched to the various parallel threads, and the threads compute the score of the valid neighbors with inter-thread split score cache access, 442, 452. Note that because the split score caches were previously warmed, or loaded with the computed scores, the threads may not need to perform any score computations. Thus, these operations may be performed without critical section, even though the threads may not be operating on completely separated data or data isolated from access by other threads. The threads again select the neighbor with the best score, 444, 454, and the selections of the individual threads are synchronized, and the best neighbor for the system is updated with the best score, 462. The current best neighbor may be controlled by the master thread, which determines if one of the neighbors scored by the threads is better than the current best neighbor.

The master thread may then apply the neighbor to the DAG and update the score, 464. If the learning is finished, 470, the final learned DAG is output, 472. If the learning is not finished, the learning is iterated, 474, to determine a neighbor with a better score. The learning may be finished based on a number of criteria for the particular implementation. For example, the neighbor may be the best neighbor for a threshold number of iterations of processing, a threshold number of iterations may have been reached, a time limit for computing may have been reached, etc.

Besides what is described herein, various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method for structure learning, comprising:
assigning a first score computation task of a structure learning scoring process for learning a probabilistic relationship between a plurality of nodes of the structure to a first thread, the first thread to access only a first partition of a shared partitioned global score cache for the first score computation task and compute a first value for use in the first score computation task, the first score computation task comprising learning neighboring nodes of a first node of the structure, the shared partitioned global cache to include scores for node families based on probabilistic relationships within each node family, the first partition to include scores for at least one node family associated with the first node;
assigning a second score computation task of the structure learning scoring process to a second thread, the second thread to access a second partition of the shared partitioned global score cache, to be restricted access to the first partition of the shared partitioned global score cache for the second score computation task, and to compute in parallel a second value for use in the second score computation task, the second score computation task comprising learning neighboring nodes of a second node of the structure, the second partition to include scores for at least one node family associated with the second node; and
the first and the second threads storing the first and the second values in the first partition of the partitioned global score cache and the second partition of the global score cache, respectively.

2. A method according to claim 1, wherein assigning the first and second score computation tasks to the first thread and the second thread comprises at least one of assigning the first and second score computation tasks to a first and a second processor of a simultaneous multiprocessor system, and assigning the first and second score computation tasks to a first and a second processing core of an on-chip multiprocessor system.

3. A method according to claim 1, wherein the first thread to access the first partition comprises the first thread to access the first partition of the shared partitioned global score cache without a critical section.

4. A method according to claim 1, wherein the first and second partitions comprise addressable elements of an array of partitions included in the shared partitioned global score cache.

5. A method according to claim 4, wherein the addressable elements of the array of partitions comprise elements associated with nodes of a Bayesian network, each of the first and second nodes associated with an element of the array.

6. A method according to claim 1, wherein the first score computation task comprises neighbor scoring for a neighbor of a structure having nodes different than the nodes of a structure of the second score computation.

7. An article of manufacture comprising a machine accessible storage medium having content to provide instructions to result in a machine performing operations for structure learning including:
   assigning a first score computation task of a structure learning scoring process for learning a probabilistic relationship between a plurality of nodes of the structure to a first thread, the first thread to access only a first partition of a shared partitioned global score cache for the first score computation task and compute a first value for use in the first score computation task, the first score computation task comprising learning neighboring nodes of a first node of the structure, the shared partitioned global cache to include scores for node families based on probabilistic relationships within each node family, the first partition to include scores for at least one node family associated with the first node;
   assigning a second score computation task of the structure learning scoring process to a second thread, the second thread to access a second partition of the shared partitioned global score cache, to be restricted access to the first partition of the shared partitioned global score cache for the second score computation task, and to compute in parallel a second value for use in the second score computation task, the second score computation task comprising learning neighboring nodes of a second node of the structure, the second partition to include scores for at least one node family associated with the second node; and
   the first and the second threads storing the first and the second values in the first partition of the partitioned global score cache and the second partition of the global score cache, respectively.

8. An article of manufacture according to claim 7, wherein assigning the first and second score computation tasks to the first thread and the second thread comprises at least one of assigning the first and second score computation tasks to a first and a second processor of a simultaneous multiprocessor system, and assigning the first and second score computation tasks to a first and a second processing core of an on-chip multiprocessor system.

9. An article of manufacture according to claim 7, wherein the first thread to access the first partition comprises the first thread to access the first partition of the shared partitioned global score cache without a critical section.

10. An article of manufacture according to claim 7, wherein the first and second partitions comprise addressable elements of an array of partitions included in the shared partitioned global score cache.

11. An article of manufacture according to claim 10, wherein the addressable elements of the array of partitions comprise elements associated with nodes of a Bayesian network, each of the first and second nodes associated with an element of the array.

12. An article of manufacture according to claim 7, wherein the first score computation task comprises neighbor scoring for a neighbor of a structure having nodes different than the nodes of a structure of the second score computation.

13. A system for structure learning, comprising:
   a processor;
   a memory; and
   a structure learning module stored in the memory and executed via at least the processor, the structure learning module to perform operations including:
      assigning a first score computation task of a structure learning scoring process for learning a probabilistic relationship between a plurality of nodes of the structure to a first thread, the first thread to access only a first partition of a shared partitioned global score cache for the first score computation task and compute a first value for use in the first score computation task, the first score computation task comprising learning a first node of the structure, the shared partitioned global cache to include scores for node families based on probabilistic relationships within each node family, the first partition to include scores for at least one node family associated with the first node,
      assigning a second score computation task of the structure learning scoring process to a second thread, the second thread to access a second partition of the shared partitioned global score cache, to be restricted access to the first partition of the shared partitioned global score cache for the second score computation task, and to compute in parallel a second value for use in the second score computation task, the second score computation task comprising learning a second node of the structure, the second partition to include scores for at least one node family associated with the second node, and
      the first and the second threads storing the first and the second values in the first partition of the partitioned global score cache and the second partition of the global score cache, respectively.

14. A system according to claim 13, wherein assigning the first and second score computation tasks to the first thread and the second thread comprises at least one of assigning the first and second score computation tasks to a first and a second processor of a simultaneous multiprocessor system, and assigning the first and second score computation tasks to a first and a second processing core of an on-chip multiprocessor system.

15. A system according to claim 13, wherein the first thread to access the first partition comprises the first thread to access the first partition of the shared partitioned global score cache without a critical section.

16. A system according to claim 13, wherein the first and second partitions comprise addressable elements of an array of partitions included in the shared partitioned global score cache.

17. A system according to claim 16, wherein the addressable elements of the array of partitions comprise elements associated with nodes of a Bayesian network, each of the first and second nodes associated with an element of the array.

18. A system according to claim 13, wherein the first score computation task comprises neighbor scoring for a neighbor of a structure having nodes different than the nodes of a structure of the second score computation.

* * * * *